US007642954B2

(12) United States Patent  
Murakami

(10) Patent No.: US 7,642,954 B2
(45) Date of Patent: Jan. 5, 2010

(54) POSITIONING APPARATUS, CONTROL METHOD OF POSITIONING APPARATUS, CONTROL PROGRAM FOR POSITIONING APPARATUS, AND COMPUTER-READABLE RECORDING MEDIUM HAVING CONTROL PROGRAM FOR POSITIONING APPARATUS RECORDED THEREIN

(75) Inventor: Makoto Murakami, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/046,742

(22) Filed: Mar. 12, 2008

(65) Prior Publication Data
US 2008/0169976 A1 Jul. 17, 2008

Related U.S. Application Data

(63) Continuation of application No. 11/638,682, filed on Dec. 14, 2006, now Pat. No. 7,365,679.

(30) Foreign Application Priority Data
Dec. 15, 2005 (JP) ............................. 2005-362045

(51) Int. Cl.
*G01S 5/14* (2006.01)
(52) U.S. Cl. ............................. 342/357.02; 342/357.12
(58) Field of Classification Search ............. 342/357.12
See application file for complete search history.

(56) References Cited
U.S. PATENT DOCUMENTS
5,781,152 A 7/1998 Renard et al.

(Continued)

FOREIGN PATENT DOCUMENTS
JP H10-339772 A 12/1998

(Continued)

OTHER PUBLICATIONS

Ziedan N I et al: "Unaided acquisition of weak GPS signals using circular correlation or double-block zero padding" Position Location and Navigation Symposium, 2004. Plans 2004 Monterey, CA, USA Apr. 26-29, 2004, Piscataway, NJ, USA, IEEE, US, Apr. 26, 2004, pp. 461-470, XP010768909 ISBN: 0-7803-8416-4 p. 464, section IV. Algorithm 2, until eq. (19).

(Continued)

*Primary Examiner*—Gregory C Issing
(74) *Attorney, Agent, or Firm*—Global IP Counselors, LLP

(57) ABSTRACT

A positioning apparatus that measures a current position by using measurement basis codes carried on satellite waves from a plurality of positioning satellites includes: a first phase error information generating unit that generates first phase error information indicating an error of a first phase on the basis of a frequency difference between a first frequency which is an estimated value of a receiving frequency of the satellite wave and a second frequency which is a frequency corresponding to a maximum value of a correlation value under a condition of the estimated phase; a second phase information generating unit that generates second phase information indicating a second phase by correcting a first phase information on the basis of the first phase error information; and a positioning unit that measures the current position on the basis of the second phase information on at least three of the positioning satellites.

8 Claims, 11 Drawing Sheets

U.S. PATENT DOCUMENTS

| | | | |
|---|---|---|---|
| 5,847,678 | A | 12/1998 | Tachita |
| 5,883,596 | A | 3/1999 | Rodal |
| 6,067,049 | A | 5/2000 | Moriya |
| 6,134,262 | A * | 10/2000 | Kitade et al. ................ 375/142 |
| 6,407,699 | B1 | 6/2002 | Yang |
| 6,603,362 | B2 | 8/2003 | Von Dolteren, Jr. |
| 6,661,371 | B2 | 12/2003 | King et al. |
| 7,006,556 | B2 | 2/2006 | Abraham et al. |
| 7,096,132 | B2 | 8/2006 | Patrick et al. |
| 7,120,191 | B2 | 10/2006 | Akopian |
| 7,133,480 | B2 | 11/2006 | Colborne et al. |
| 7,142,589 | B2 | 11/2006 | Valio |
| 7,209,076 | B2 | 4/2007 | Roh |
| 7,266,144 | B1 | 9/2007 | Sanders |
| 7,327,311 | B2 * | 2/2008 | Dooley et al. .......... 342/357.02 |
| 2002/0075969 | A1 | 6/2002 | Sande et al. |
| 2002/0154681 | A1 * | 10/2002 | Kontola ..................... 375/147 |
| 2003/0072356 | A1 | 4/2003 | Abraham et al. |
| 2003/0201935 | A1 | 10/2003 | King et al. |
| 2004/0057505 | A1 * | 3/2004 | Valio ......................... 375/148 |
| 2004/0143612 | A1 | 7/2004 | Patrick et al. |
| 2004/0196183 | A1 | 10/2004 | Roh |
| 2005/0099334 | A1 | 5/2005 | Roh |
| 2005/0135463 | A1 | 6/2005 | Cho |
| 2006/0238418 | A1 | 10/2006 | Monnerat et al. |

FOREIGN PATENT DOCUMENTS

| | | |
|---|---|---|
| JP | 2003-255036 A | 9/2003 |
| WO | WO-03/036322 A2 | 5/2003 |

OTHER PUBLICATIONS

Chun Yang: "GPS Signal Tracking with Kalman Filter Based on Joint Code Delay and Carrier Phase and Frequency Error Discriminator" ION 60th Annual Meeting, [Online] Jun. 7, 2004-Jun. 9, 2004 pp. 631-640, XP007901920 ION fig. 2;; eq. (I) p. 632, "point tracking vs. grid tracking", par. 4; fig. I-b p. 633-634, "joint error discriminator" section, par. 8-11 p. 636, "preliminary test results", par.1-3.

James Bao-Yen Tsui: "Fundamentals of Global Positioning System Receivers: A Software Approach" Book-Fragment, [Online] Jan. 27, 2005, pp. 34-38, XP002427575 John Wiley &Sons, Inc. ISBN: 978 04 7171 258 9 eq. 3.10 and 3.11, p. 37.

James Bao-Yen Tsui: "Fundamentals of Global Positioning System Receivers: A Software Approach" Book-Fragment, [Online] Jan. 27, 2005, pp. 271-273, XP002427578 ISBN: 978 04 7171 258 9 p. 272.

* cited by examiner

FIG. 5

EXPLANATORY VIEW OF
FIRST IF FREQUENCY CALCULATING PROGRAM 116

FIRST IF FREQUENCY f1 =
(BASIC IF FREQUENCY Af) − (DOPPLER SHIFT Bf)

FIG. 6

EXPLANATORY VIEW OF
CORRELATION CONDITION SETTING PROGRAM 118

| TERMINAL-SIDE CODE PHASE (chip) | early(cp1early):cp1−1/2 |
| --- | --- |
| | normal:cp1 |
| | late(cp1late):cp1+1/2 |
| TERMINAL-SIDE IF FREQUENCY (Hz) | low(f1low):f1−fs |
| | middle:f1 |
| | high(f1high):f1+fs |

EXPLANATORY VIEW (1) OF
FIRST CODE PHASE CALCULATING PROGRAM (122)

EQUATION 1:  $x < x0 : y = a(x-x0) + y0$
$x0 < x : y = -a(x-x0) + y0$
*A IS POSITIVE NUMBER

EXPLANATORY VIEW (2) OF
FIRST CODE PHASE CALCULATING PROGRAM (122)

x1: CODE PHASE OF cp1 early (early)  x1=x2−1/2chip
x2: CODE PHASE OF cp1 (normal)  x2
x3: CODE PHASE OF cp1 late (late)  x3=x2+1/2chip y1: CORRELATION VALUE OF cp1 early (early)
y2: CORRELATION VALUE OF cp1 (normal)
y3: CORRELATION VALUE OF cp1 late (late)

x0 IS CALCULATED BY SLOVING SIMULTANEOUS EQUATIONS 2
x0=cp1

FIG. 9A

EXPLANATORY VIEW OF
SECOND IF FREQUENCY CALCULATING PROGRAM (126)

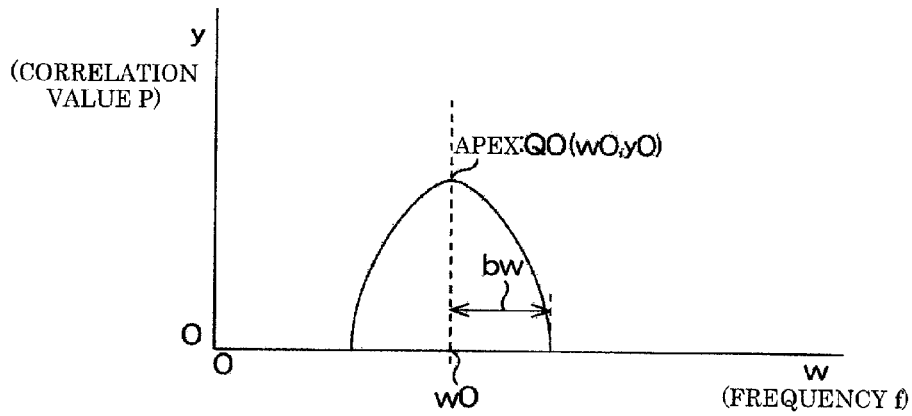

FIG. 9B

RELATIONSHIP BETWEEN FREQUENCY AND CORRELATION VALUE

EQUATION 3: $y = b \times \sin\{2\pi(x-w0)/bw\} / \{(x-w0)/bw\} + y0$

* $w$: FREQUENCY, $y$: CORRELATION VALUE, $b$: VARIABLE
  $bw$: FREQUENCY BAND
  $bw = 2/tc$ ASSUMING THAT COHERENT INTEGRATION TIME IS $tc$

UNKNOWN QUANTITIES ARE $b$, $w0$, AND $y0$

FIG. 9C

SIMULTANEOUS EQUATIONS 4
$\begin{cases} y1 = b(w1-w0) + y0 \\ y2 = b(w2-w0) + y0 \\ y3 = b(w3-w0) + y0 \end{cases}$
↓
$w0$, $y0$, AND $b$ CAN BE CALCULATED BY SOLVING SIMULTANEOUS EQUATIONS 4
→$w0 = f2$

FIG. 10

EXPLANATORY VIEW OF FREQUENCY ERROR CALCULATING PROGRAM 128

EQUATION 5: FREQUENCY ERROR $df1 = f1 - f2$

FIG. 11

EXPLANATORY VIEW OF FREQUENCY ERROR RATE CALCULATING PROGRAM 130

EQUATION 6: FREQUENCY ERROR RATE $\alpha = df1 / f1$

FIG. 12

EXPLANATORY VIEW OF CODE PHASE ERROR CALCULATING PROGRAM 132

EQUATION 7: CODE PHASE ERROR $= dcp1 =$ FREQUENCY ERROR RATE $\alpha \times$ CODE PHASE RANGE R $\times$ INTEGRATION NUMBER OF TIMES n

* FREQUENCY ERROR RATE $\alpha$
  = CODE PHASE ERROR RATE

CODE PHASE RANGE R: RANGE (1023 chip) OF VALUE OF CODE PHASE, 1 ms IN TIME

INTEGRATION NUMBER OF ITEMS n: INCOHERENT NUMBER OF TIMES

FIG. 13

EXPLANATORY VIEW OF SECOND CODE PHASE CALCULATING PROGRAM 134

EQUATION 8: SECOND CODE PHASE $cp2 = cp1 - dcp1$

POSITIONING APPARATUS, CONTROL
METHOD OF POSITIONING APPARATUS,
CONTROL PROGRAM FOR POSITIONING
APPARATUS, AND COMPUTER-READABLE
RECORDING MEDIUM HAVING CONTROL
PROGRAM FOR POSITIONING APPARATUS
RECORDED THEREIN

CROSS-REFERENCE TO THE RELATED
APPLICATIONS

This application claims priority to Japanese Patent Application No. 2005-362045 and U.S. patent application Ser. No. 11/638,682. The entire disclosure of Japanese Patent Application No. 2005-362045 and U.S. patent application No. 11/638,682 is hereby incorporated herein by reference.

BACKGROUND OF THE INVENTION

The present invention relates to a positioning apparatus that uses an electric wave from a positioning satellite, a control method of the positioning apparatus, a control program for the positioning apparatus, and a computer-readable recording medium having the control program for a positioning apparatus recorded therein.

A positioning system that measures the current position of a GPS receiver by using, for example, a GPS (global positioning system) serving as a satellite navigation system has been put to practical use.

The GPS receiver receives a C/A (clear and acquisition or coarse and access) code, which is one of the pseudo random noise codes (hereinafter, referred to as 'PN code') carried on an electric wave (hereinafter, referred to as 'satellite wave') from a GPS satellite, on the basis of a navigation message (including approximate satellite orbit information (almanac) and precise satellite orbit information (ephemeris)) indicating an orbit of the GPS satellite and the like. The C/A code is a code serving as a basis for positioning.

The GPS receiver determines from which GPS satellite the C/A code has been transmitted and then calculates a distance (pseudo range) between the GPS satellite and the GPS receiver on the basis of transmission time and receiving time of the C/A code. In addition, the GPS receiver is configured to measure the position of the GPS receiver on the basis of pseudo ranges with respect to three or more GPS satellites and the position of each GPS satellite on a satellite orbit (for example, refer to JP-A-10-339772).

The GPS receiver performs code synchronization between the received C/A code and a replica C/A code that the GPS receiver has, thereby calculating a phase (hereinafter, referred to as 'code phase') indicating a maximum correlation value. The GPS receiver calculates the pseudo range by using the code phase.

Since the C/A code is carried on the satellite wave, it is necessary to perform synchronization (hereinafter, referred to as 'frequency synchronization') between a carrier frequency of the received satellite wave and a frequency inside the GPS receiver in addition to the code synchronization in order to accurately perform the code synchronization.

In the case when the strength of a satellite wave is large and accordingly it is possible to output a correlation result that can be used for positioning every short period of time, for example, every 1 millisecond (ms), the frequency synchronization can be performed by using a PLL (phase locked loop) that serves to modify a frequency on the basis of the correlation result.

However, when the strength of a satellite wave is weak, the frequency synchronization using the PLL cannot be performed, and thus the code synchronization cannot also be performed.

For this reason, there has been proposed a technique in which a carrier frequency is detected by using a correlation result calculated by using a receiving channel for holding synchronization and the frequency synchronization is held (for example, refer to JP-A-2003-255036).

However, when the strength of a satellite wave is very weak, it is necessary to secure a long integration time (time until a correlation result is obtained after integration starts, the time being a part of time obtained by summing up coherent time and incoherent time) for C/A codes, for example, 1 second (s) or more.

Here, as described in the above technique, when the correlation result is fed back to a subsequent correlation process, a large amount time gap occurs, which makes frequency traceability worse.

Thus, a problem occurs in that precision of the code synchronization is reduced and positioning precision is reduced or the positioning cannot be performed.

SUMMARY

According to one aspect of the invention, there is provided a positioning apparatus that measures a current position by using measurement basis codes carried on satellite waves from a plurality of positioning satellites, comprising:

a first frequency information generating unit that generates first frequency information indicating a first frequency which is an estimated value of a receiving frequency of the satellite wave;

an estimated phase acquisition unit that acquires an estimated phase of the measurement basis code estimated to correspond to a maximum value of a correlation value between the measurement basis code received from the positioning satellite and a replica measurement basis code generated by the positioning apparatus;

a first correlation information generating unit that generates first correlation information indicating a correlation value between the measurement basis code and the replica measurement basis code under the condition of the first frequency;

a first phase information generating unit that generates first phase information indicating a first phase, which is a phase of the measurement basis code corresponding to a maximum value of the correlation value under the condition of the first frequency, on the basis of the first correlation information;

a second correlation information generating unit that generates second correlation information indicating a correlation value among at least three frequencies of the first frequency, a first low frequency lower than the first frequency by a predetermined frequency, and a first high frequency higher than the first frequency by the predetermined frequency under the condition of the estimated phase;

a second frequency information generating unit that generates second frequency information indicating a second frequency, which is a frequency corresponding to a maximum value of the correlation value under the condition of the estimated phase, on the basis of the second correlation information;

a frequency difference information generating unit that generates frequency difference information indicating a frequency difference between the first frequency and the second frequency;

a frequency difference rate information generating unit that generates frequency difference rate information indicating a ratio of the frequency difference to the first frequency;

a first phase error information generating unit that generates first phase error information indicating an error of the first phase on the basis of the frequency difference rate information;

a second phase information generating unit that generates second phase information indicating a second phase by correcting the first phase information on the basis of the first phase error information; and a positioning unit that measures the current position on the basis of the second phase information on at least three of the positioning satellites.

According to another aspect of the present invention, there is provided a control method of a positioning apparatus that measures a current position by using measurement basis codes carried on satellite waves from a plurality of positioning satellites, comprising:

generating first frequency information indicating a first frequency, which is an estimated value of a receiving frequency of the satellite wave, by means of the positioning apparatus;

acquiring an estimated phase of the measurement basis code estimated to correspond to a maximum value of a correlation value between the measurement basis code received from the positioning satellite and a replica measurement basis code generated by the positioning apparatus by means of the positioning apparatus;

generating first correlation information indicating a correlation value between the measurement basis code and the replica measurement basis code under the condition of the first frequency by means of the positioning apparatus;

generating first phase information indicating a first phase, which is a phase of the measurement basis code corresponding to a maximum value of the correlation value under the condition of the first frequency, on the basis of the first correlation information by means of the positioning apparatus;

generating second correlation information indicating a correlation value among at least three frequencies of the first frequency, a first low frequency lower than the first frequency by a predetermined frequency, and a first high frequency higher than the first frequency by the predetermined frequency under the condition of the estimated phase by means of the positioning apparatus;

generating second frequency information indicating a second frequency, which is a frequency corresponding to a maximum value of the correlation value under the condition of the estimated phase, on the basis of the second correlation information by means of the positioning apparatus;

generating frequency difference information indicating a frequency difference between the first frequency and the second frequency by means of the positioning apparatus;

generating frequency difference rate information indicating a ratio of the frequency difference to the first frequency by means of the positioning apparatus;

generating first phase error information indicating an error of the first phase on the basis of the frequency difference rate information by means of the positioning apparatus;

generating second phase information indicating a second phase by correcting the first phase information on the basis of the first phase error information by means of the positioning apparatus; and measuring the current position on the basis of the second phase information on at least three of the positioning satellites by means of the positioning apparatus.

According to a further aspect of the invention, there is provided a control program for a positioning apparatus that measures a current position by using measurement basis codes carried on satellite waves from a plurality of positioning satellites, the control program causing a computer to execute:

generating first frequency information indicating a first frequency, which is an estimated value of a receiving frequency of the satellite wave, by means of the positioning apparatus;

acquiring an estimated phase of the measurement basis code estimated to correspond to a maximum value of a correlation value between the measurement basis code received from the positioning satellite and a replica measurement basis code generated by the positioning apparatus by means of the positioning apparatus;

generating first correlation information indicating a correlation value between the measurement basis code and the replica measurement basis code under the condition of the first frequency by means of the positioning apparatus;

generating first phase information indicating a first phase, which is a phase of the measurement basis code corresponding to a maximum value of the correlation value under the condition of the first frequency, on the basis of the first correlation information by means of the positioning apparatus;

generating second correlation information indicating a correlation value among at least three frequencies of the first frequency, a first low frequency lower than the first frequency by a predetermined frequency, and a first high frequency higher than the first frequency by the predetermined frequency under the condition of the estimated phase by means of the positioning apparatus;

generating second frequency information indicating a second frequency, which is a frequency corresponding to a maximum value of the correlation value under the condition of the estimated phase, on the basis of the second correlation information by means of the positioning apparatus;

generating frequency difference information indicating a frequency difference between the first frequency and the second frequency by means of the positioning apparatus;

generating frequency difference rate information indicating a ratio of the frequency difference to the first frequency by means of the positioning apparatus; generating first phase error information indicating an error of the first phase on the basis of the frequency difference rate information by means of the positioning apparatus;

generating second phase information indicating a second phase by correcting the first phase information on the basis of the first phase error information by means of the positioning apparatus; and measuring the current position on the basis of the second phase information on at least three of the positioning satellites by means of the positioning apparatus.

According to still another aspect of the invention, there is provided a computer-readable recording medium storing a control program for a positioning apparatus that measures a current position by using measurement basis codes carried on satellite waves from a plurality of positioning satellites, the control program causing a computer to execute:

generating first frequency information indicating a first frequency, which is an estimated value of a receiving frequency of the satellite wave, by means of the positioning apparatus;

acquiring an estimated phase of the measurement basis code estimated to correspond to a maximum value of a correlation value between the measurement basis code received from the positioning satellite and a replica measurement basis code generated by the positioning apparatus by means of the positioning apparatus;

generating first correlation information indicating a correlation value between the measurement basis code and the replica measurement basis code under the condition of the first frequency by means of the positioning apparatus;

generating first phase information indicating a first phase, which is a phase of the measurement basis code corresponding to a maximum value of the correlation value under the condition of the first frequency, on the basis of the first correlation information by means of the positioning apparatus;

generating second correlation information indicating a correlation value among at least three frequencies of the first frequency, a first low frequency lower than the first frequency by a predetermined frequency, and a first high frequency higher than the first frequency by the predetermined frequency under the condition of the estimated phase by means of the positioning apparatus;

generating second frequency information indicating a second frequency, which is a frequency corresponding to a maximum value of the correlation value under the condition of the estimated phase, on the basis of the second correlation information by means of the positioning apparatus;

generating frequency difference information indicating a frequency difference between the first frequency and the second frequency by means of the positioning apparatus;

generating frequency difference rate information indicating a ratio of the frequency difference to the first frequency by means of the positioning apparatus;

generating first phase error information indicating an error of the first phase on the basis of the frequency difference rate information by means of the positioning apparatus;

generating second phase information indicating a second phase by correcting the first phase information on the basis of the first phase error information by means of the positioning apparatus; and measuring the current position on the basis of the second phase information on at least three of the positioning satellites by means of the positioning apparatus.

BRIEF DESCRIPTION OF THE SEVERAL VIEWS OF THE DRAWINGS

FIG. 5 is a view explaining a first IF frequency calculating program.

FIG. 6 is a view explaining a correlation condition setting program.

FIG. 9A is a view explaining a second IF frequency calculating program.

FIG. 9B is a view explaining the second IF frequency calculating program.

FIG. 9C is a view explaining the second IF frequency calculating program.

FIG. 10 is a view explaining a frequency error calculating program.

FIG. 11 is a view explaining a frequency error rate calculating program.

FIG. 12 is a view explaining a code phase error calculating program.

FIG. 13 is a view explaining a second code phase calculating program.

DETAILED DESCRIPTION OF THE EMBODIMENT

Figure 1:
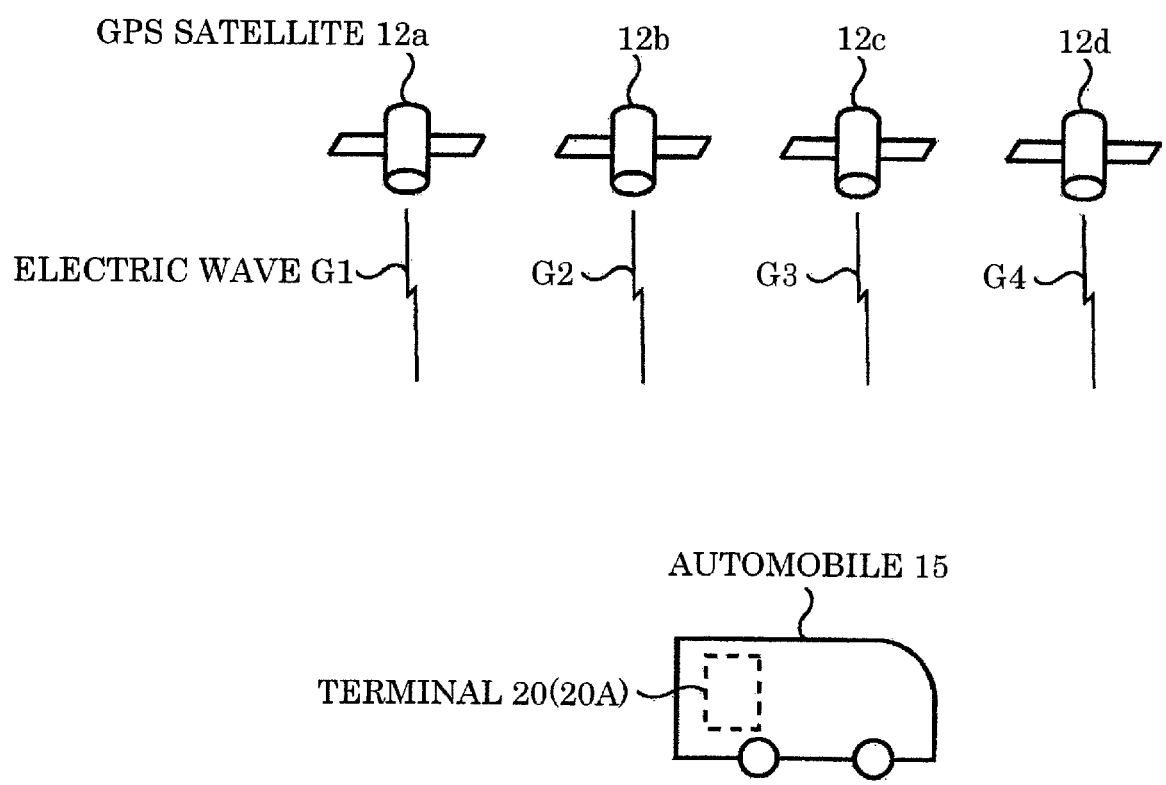
FIG. 1 is a view schematically illustrating a terminal and the like in an embodiment of the invention.

An advantage of some aspects of the invention is that it provides a positioning apparatus capable of measuring the position thereof with high precision in the case when the strength of a satellite wave is very weak and a long integration time for positioning codes is required, a control method of the positioning apparatus, a control program for the positioning apparatus, and a computer-readable recording medium having the control program for a positioning apparatus recorded therein.

In order to achieve the above objects, according to an aspect of the invention, a positioning apparatus that measures a current position by using measurement basis codes carried on satellite waves from a plurality of positioning satellites includes: a first frequency information generating unit that generates first frequency information indicating a first frequency which is an estimated value of a receiving frequency of the satellite wave; an estimated phase acquisition unit that acquires an estimated phase of the measurement basis code estimated to correspond to a maximum value of a correlation value between the measurement basis code received from the positioning satellite and a replica measurement basis code generated by the positioning apparatus; a first correlation information generating unit that generates first correlation information indicating a correlation value between the measurement basis code and the replica measurement basis code under the condition of the first frequency; a first phase information generating unit that generates first phase information indicating a first phase, which is a phase of the measurement basis code corresponding to a maximum value of the correlation value under the condition of the first frequency, on the basis of the first correlation information; a second correlation information generating unit that generates second correlation information indicating a correlation value among at least three frequencies of the first frequency, a first low frequency lower than the first frequency by a predetermined frequency, and a first high frequency higher than the first frequency by the predetermined frequency under the condition of the estimated phase; a second frequency information generating unit that generates second frequency information indicating a second frequency, which is a frequency corresponding to a maximum value of the correlation value under the condition of the estimated phase, on the basis of the second correlation information; a frequency difference information generating unit that generates frequency difference information indicating a frequency difference between the first frequency and the second frequency; a frequency difference rate information generating unit that generates frequency difference rate information indicating a ratio of the frequency difference to the first frequency; a first phase error information generating unit that generates first phase error information indicating an error of the first phase on the basis of the frequency difference rate information; a second phase information generating unit that generates second phase information indicating a second phase by correcting the first phase information on the basis of the first phase error information; and a positioning unit that measures the current position on the basis of the second phase information on at least three of the positioning satellites.

In the positioning apparatus having the configuration described above, the first correlation information generating unit can generate the first correlation information indicating the correlation value between the measurement basis code and the replica measurement basis code under the condition of the first frequency. In addition, the 'correlation value' refers to a correlation value between the measurement basis code and the replica measurement basis code.

Further, in the positioning apparatus, the first phase information generating unit can generate the first phase information indicating the phase of the measurement basis code corresponding to the maximum value of the correlation value under the condition of the first frequency, on the basis of the first correlation information.

Here, the measurement basis code is carried on the satellite wave. Accordingly, if the first IF frequency is deviated from a true IF frequency, the precision of the first correlation information is reduced in accordance with the deviation rate. As a result, the precision of the first phase information is also reduced.

Accordingly, in the positioning apparatus described above, the first phase information can be corrected on the basis of the deviation between the first frequency and the true receiving frequency, which will be described below.

The relationship between a receiving frequency and a correlation value in a predetermined phase can be expressed in an equation including three unknown quantities of a maximum value of a correlation value, a frequency corresponding to the maximum value of the correlation value, and one variable. Therefore, the above equation can be solved by calculating a correlation value among at least three frequencies. As a result, the frequency corresponding to the maximum value of the correlation value can be calculated.

Accordingly, the second correlation information generating unit of the positioning apparatus is configured to generate the second correlation information related to the three frequencies of the first frequency, the first low frequency, and the first high frequency. In addition, in the positioning apparatus, the second frequency information generating unit can generate the second frequency information indicating the second frequency, which is a frequency corresponding to the maximum value of the correlation value under the condition of the estimated phase, on the basis of the second correlation information.

Furthermore, in the positioning apparatus, the frequency difference information generating unit can generate the frequency difference information indicating the frequency difference between the first frequency and the second frequency and the frequency difference rate information generating unit can generate the frequency difference rate information indicating a frequency difference ratio which is a ratio of the frequency difference to the first frequency.

Here, since the measurement basis code is carried on the satellite wave, the frequency difference rate is equal to an error rate of the first phase with respect to a true phase of the measurement basis code. Thus, the first phase error information generating unit of the positioning apparatus can generate the first phase error information indicating the error of the first phase on the basis of the frequency difference rate information.

Furthermore, in the positioning apparatus, the second phase information generating unit can generate the second phase information by correcting the first phase information on the basis of the first phase error information.

In addition, in the positioning apparatus, the positioning unit can measure the current position on the basis of the second phase information on at least three of the positioning satellites.

As described above, the positioning apparatus performs a positioning process on the basis of the second phase information that is generated by correcting the first phase information on the basis of the first phase error information. Here, the first phase error information is not information generated on the basis of the first phase information. This means that a correlation process of generating the first phase information and a correlation process of generating the first phase error information can be performed simultaneously and in parallel. Accordingly, by simultaneously performing a plurality of correlation processes at predetermined timing, it is possible to perform a positioning process without performing a subsequent correlation process at different time. In other words, the positioning process can be performed on the basis of a correlation result generated simultaneously and in parallel, without modifying subsequent correlation processes due to time-lag information.

Thus, in the case when the strength of a satellite wave is very weak and a long integration time for positioning codes is required, the position can be measured with high precision.

In the positioning apparatus having the configuration described above, preferably, the first frequency information generating unit is configured to generate the first frequency information on the basis of orbit information indicating an orbit of the positioning satellite and approximate position information of the positioning apparatus stored beforehand.

According to the configuration described above, the positioning apparatus can generate the first frequency information without performing a correlation process.

Further, in the positioning apparatus having the configuration described above, preferably, the estimated phase acquisition unit is configured to generate the estimated phase information or acquire a phase at the time of previous measurement of position on the basis of orbit information indicating an orbit of the positioning satellite and approximate position information of the positioning apparatus stored beforehand.

According to the configuration described above, since the estimated phase acquisition unit of the positioning apparatus is configured to generate the estimated phase information on the basis of the orbit information indicating the orbit of the positioning satellite and the approximate position information of the positioning apparatus stored beforehand, it is possible to acquire the estimated phase information without performing a correlation process.

Furthermore, in the positioning apparatus having the configuration described above, preferably, the estimated phase acquisition unit is configured to acquire a phase at the time of previous measurement of position.

According to the configuration described above, since the estimated phase acquisition unit of the positioning apparatus is configured to acquire a phase at the time of the previous measurement of position, the estimated phase information can be acquired without a correlation process when performing new measurement of position.

In addition, in the positioning apparatus having the configuration described above, it is preferable to further include a preliminary correlation information generating unit that generates preliminary correlation information indicating a correlation value between the measurement basis code and the replica measurement basis code under the condition of the estimated phase, in at least three frequencies including the first frequency. In addition, preferably, the first frequency information generating unit is configured to generate the first frequency information on the basis of the preliminary correlation information.

According to the configuration described above, since the first frequency information is generated on the basis of the preliminary correlation information generated by actually performing a correlation process, the first frequency information is high-precision information. Accordingly, the precision of the first phase information also increases.

In addition, since the first phase information is the high-precision information, the second phase information generated by the correction based on the first phase error information becomes more precise information.

According to another aspect of the invention, a control method of a positioning apparatus that measures a current position by using measurement basis codes carried on satellite waves from a plurality of positioning satellites includes: generating first frequency information indicating a first frequency, which is an estimated value of a receiving frequency of the satellite wave, by means of the positioning apparatus; acquiring an estimated phase of the measurement basis code estimated to correspond to a maximum value of a correlation value between the measurement basis code received from the positioning satellite and a replica measurement basis code generated by the positioning apparatus by means of the positioning apparatus; generating first correlation information indicating a correlation value between the measurement basis code and the replica measurement basis code under the condition of the first frequency by means of the positioning apparatus; generating first phase information indicating a first phase, which is a phase of the measurement basis code corresponding to a maximum value of the correlation value under the condition of the first frequency, on the basis of the first correlation information by means of the positioning apparatus; generating second correlation information indicating a correlation value among at least three frequencies of the first frequency, a first low frequency lower than the first frequency by a predetermined frequency, and a first high frequency higher than the first frequency by the predetermined frequency under the condition of the estimated phase by means of the positioning apparatus; generating second frequency information indicating a second frequency, which is a frequency corresponding to a maximum value of the correlation value under the condition of the estimated phase, on the basis of the second correlation information by means of the positioning apparatus; generating frequency difference information indicating a frequency difference between the first frequency and the second frequency by means of the positioning apparatus; generating frequency difference rate information indicating a ratio of the frequency difference to the first frequency by means of the positioning apparatus; generating first phase error information indicating an error of the first phase on the basis of the frequency difference rate information by means of the positioning apparatus; generating second phase information indicating a second phase by correcting the first phase information on the basis of the first phase error information by means of the positioning apparatus; and measuring the current position on the basis of the second phase information on at least three of the positioning satellites by means of the positioning apparatus.

According to the above-described control method of a positioning apparatus, in the same manner as in the positioning apparatus described above, in the case when the strength of a satellite wave is very weak and a long integration time for positioning codes is required, the position can be measured with high precision.

Further, according to still another aspect of the invention, there is provided a control program for a positioning apparatus that measures a current position by using measurement basis codes carried on satellite waves from a plurality of positioning satellites, the control program causing a computer to execute: generating first frequency information indicating a first frequency, which is an estimated value of a receiving frequency of the satellite wave, by means of the positioning apparatus; acquiring an estimated phase of the measurement basis code estimated to correspond to a maximum value of a correlation value between the measurement basis code received from the positioning satellite and a replica measurement basis code generated by the positioning apparatus by means of the positioning apparatus; generating first correlation information indicating a correlation value between the measurement basis code and the replica measurement basis code under the condition of the first frequency by means of the positioning apparatus; generating first phase information indicating a first phase, which is a phase of the measurement basis code corresponding to a maximum value of the correlation value under the condition of the first frequency, on the basis of the first correlation information by means of the positioning apparatus; generating second correlation information indicating a correlation value among at least three frequencies of the first frequency, a first low frequency lower than the first frequency by a predetermined frequency, and a first high frequency higher than the first frequency by the predetermined frequency under the condition of the estimated phase by means of the positioning apparatus; generating second frequency information indicating a second frequency, which is a frequency corresponding to a maximum value of the correlation value under the condition of the estimated phase, on the basis of the second correlation information by means of the positioning apparatus; generating frequency difference information indicating a frequency difference between the first frequency and the second frequency by means of the positioning apparatus; generating frequency difference rate information indicating a ratio of the frequency difference to the first frequency by means of the positioning apparatus; generating first phase error information indicating an error of the first phase on the basis of the frequency difference rate information by means of the positioning apparatus; generating second phase information indicating a second phase by correcting the first phase information on the basis of the first phase error information by means of the positioning apparatus; and measuring the current position on the basis of the second phase information on at least three of the positioning satellites by means of the positioning apparatus.

Furthermore, according to still another aspect of the invention, there is provided a computer-readable recording medium storing a control program for a positioning apparatus that measures a current position by using measurement basis codes carried on satellite waves from a plurality of positioning satellites, the control program causing a computer to execute: generating first frequency information indicating a first frequency, which is an estimated value of a receiving frequency of the satellite wave, by means of the positioning apparatus; acquiring an estimated phase of the measurement basis code estimated to correspond to a maximum value of a correlation value between the measurement basis code received from the positioning satellite and a replica measurement basis code generated by the positioning apparatus by means of the positioning apparatus; generating first correlation information indicating a correlation value between the measurement basis code and the replica measurement basis code under the condition of the first frequency by means of the positioning apparatus; generating first phase information indicating a first phase, which is a phase of the measurement basis code corresponding to a maximum value of the correlation value under the condition of the first frequency, on the basis of the first correlation information by means of the positioning apparatus; generating second correlation information indicating a correlation value among at least three frequencies of the first frequency, a first low frequency lower than the first frequency by a predetermined frequency, and a first high frequency higher than the first frequency by the predetermined frequency under the condition of the estimated phase by means of the positioning apparatus; generating second frequency information indicating a second frequency, which is a frequency corresponding to a maximum value of the correlation value under the condition of the estimated phase, on the basis of the second correlation information by means of the positioning apparatus; generating frequency difference information indicating a frequency difference between the first frequency and the second frequency by means of the positioning apparatus; generating frequency difference rate information indicating a ratio of the frequency difference to the first frequency by means of the positioning apparatus; generating first phase error information indicating an error of the first phase on the basis of the frequency difference rate information by means of the positioning apparatus; generating second phase information indicating a second phase by correcting the first phase information on the basis of the first phase error information by means of the positioning apparatus; and measuring the current position on the basis of the second phase information on at least three of the positioning satellites by means of the positioning apparatus.

Hereinafter, preferred embodiments of the invention will be described in detail with reference to the accompanying drawings.

Note that since embodiments to be described below are preferred specific examples of the invention, technically preferable various limitations are attached to the embodiments. However, the scope of the invention is not limited to these modes unless there are descriptions specifically limiting the invention in the following explanation.

FIG. 1 is a view schematically illustrating a terminal 20 and the like in an embodiment of the invention.

As shown in FIG. 1, the terminal 20 can receive electric waves G1, G2, G3, and G4 from a plurality of positioning satellites, for example, GPS satellites 12a, 12b, 12c, and 12d. The electric waves G1, G2, G3, and G4 are examples of a satellite wave.

The electric waves G1, G2, G3, and G4 include various kinds of codes carried thereon. One of those is a C/A code. The C/A code includes 1023 chips. In addition, the C/A code is a signal having a bit rate of 1.023 Mbps and a bit length of 1023 bits (=1 msec). The C/A code is an example of a basic code for positioning. In addition, the terminal 20 is an example of a positioning apparatus for measuring the current position.

The terminal 20 is mounted in an automobile 15 so as to measure the current position while moving along the automobile 15.

The terminal 20 is configured to measure the current position by receiving a C/A code from, for example, three or more different GPS satellites (for example, the GPS satellite 12a and the like).

First, the terminal 20 determines to which GPS satellite the received C/A code corresponds. Then, the terminal 20 calculates the phase (hereinafter, referred to as 'code phase') of the received C/A code by means of a correlation process. Thereafter, by using the code phase, the terminal 20 calculates transmission time and receiving time of the C/A code and a distance (hereinafter, referred to as 'pseudo range') between the terminal 20 and each GPS satellite (for example, the GPS satellite 12a). Then, a positioning operation on the current position can be performed on the basis of the pseudo range and the position of each GPS satellite (for example, the GPS satellite 12a) on a satellite orbit at current time.

Since the C/A code is carried on the electric wave (for example, the electric wave G1), the precision of a code phase calculated by the correlation process is reduced if a receiving frequency when the terminal 20 receives an electric wave (for example, the electric wave G1) is not accurate. Since the GPS satellite (for example, the GPS satellite 12a) moves around the orbit of the satellite, the receiving frequency continuously varies. At this time, if the strength of an electric wave (for example, the electric wave G1) is large, it is possible to continuously perform frequency synchronization by using a PLL, for example.

However, when the strength of an electric wave (for example, the electric wave G1) is very weak, the PLL does not operate effectively. In addition, a method of using a previous correlation result in order to change a frequency in a subsequent correlation process is not effective for solving a frequency error, because there is time difference in the case when a long integrated time is required.

However, as will be described below, the terminal 20 is configured to measure the current position with high precision even when the strength of an electric wave (for example, the electric wave G1) is very weak.

For example, the terminal 20 is a mobile phone, a PHS (personal handy-phone system), a PDA (personal digital assistance), or the like; however, the terminal 20 is not limited to thereto.

In addition, the number of GPS satellites is not limited to four (for example, the GPS satellites 12a, 12b, 12c, and 12d). For example, three or five or more GPS satellites may be used.

Main Hardware Configuration of Terminal 20

Figure 2:
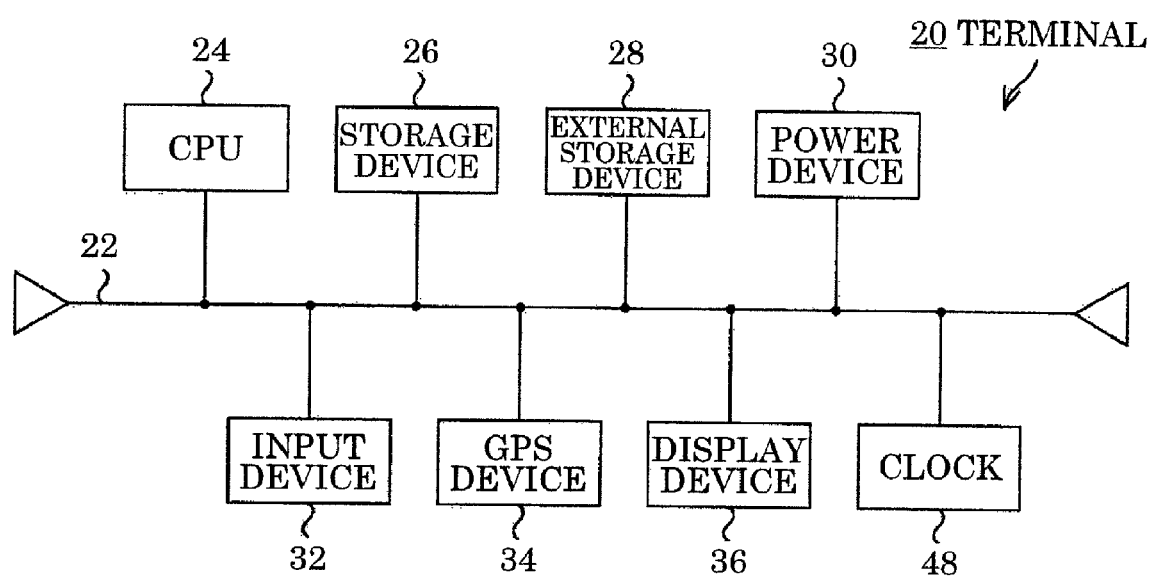
FIG. 2 is a view schematically illustrating the main hardware configuration of a terminal.

FIG. 2 is a view schematically illustrating the main hardware configuration of the terminal 20.

As shown in FIG. 2, the terminal 20 includes a computer in which a bus 22 is provided. A CPU (central processing unit) 24, a storage device 26, and the like are connected to the bus 22. The storage device 26 is a RAM (random access memory) or a ROM (read only memory), for example.

In addition, an external storage device 28 is connected to the bus 22. The external storage device 28 is a HDD (hard disc drive), for example.

In addition, a power device 30, an input device 32, a GPS device 34, a display device 36, and a clock 48 are connected to the bus 22.

Configuration of GPS Device 34

Figure 3:
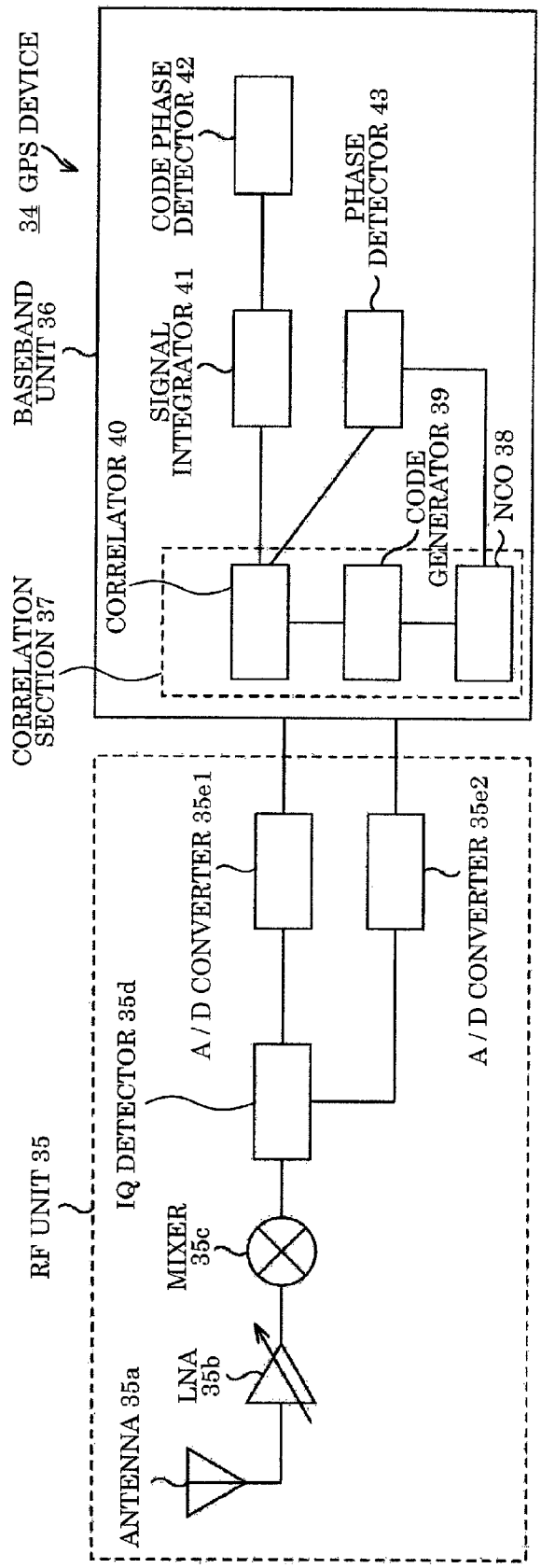
FIG. 3 is a view schematically illustrating the configuration of a GPS device.

FIG. 3 is a view schematically illustrating the configuration of the GPS device 34.

As shown in FIG. 3, the GPS device 34 includes an RF unit 35 and a baseband unit 36.

In the RF unit 35, an antenna 35a receives, for example, the electric wave G1. Then, an LNA 35b serving as an amplifier amplifies a signal, such as a C/A code, carried on the electric wave G1. Then, a mixer 35c down converts a frequency of the signal to an IF frequency. Then, an IQ detector 35d performs an IQ separation with respect to the signal. Subsequently, A/D converters 35e1 and 35e2 convert the IQ-separated signal to a digital signal.

The baseband unit 36 receives the A/D converted digital signal having the IF frequency from the RF unit 35.

A correlation section 37 of the baseband unit 36 integrates the input digital signal and replica C/A code for 10 milliseconds, for example, and performs a correlation process (coherent process). The correlation section 37 includes an NCO 38, a code generator 39, and a correlator 40. The code generator 39 generates a replica C/A code at the timing of a clock generated by the NCO 38. The correlator 40 samples chips (not shown) of a signal and integrates the sampled chips and then performs correlation with the replica C/A code. In the correlation section 37, a frequency and phase of a replica C/A code can be set.

When the wave strength of an electric wave (for example, the electric wave G1) is sufficiently large, it is possible to form a PLL since a phase detector 43 acquires phase information from the correlator 40 and supplies the information to the NCO 38.

Main Software Configuration of Terminal 20

Figure 4:
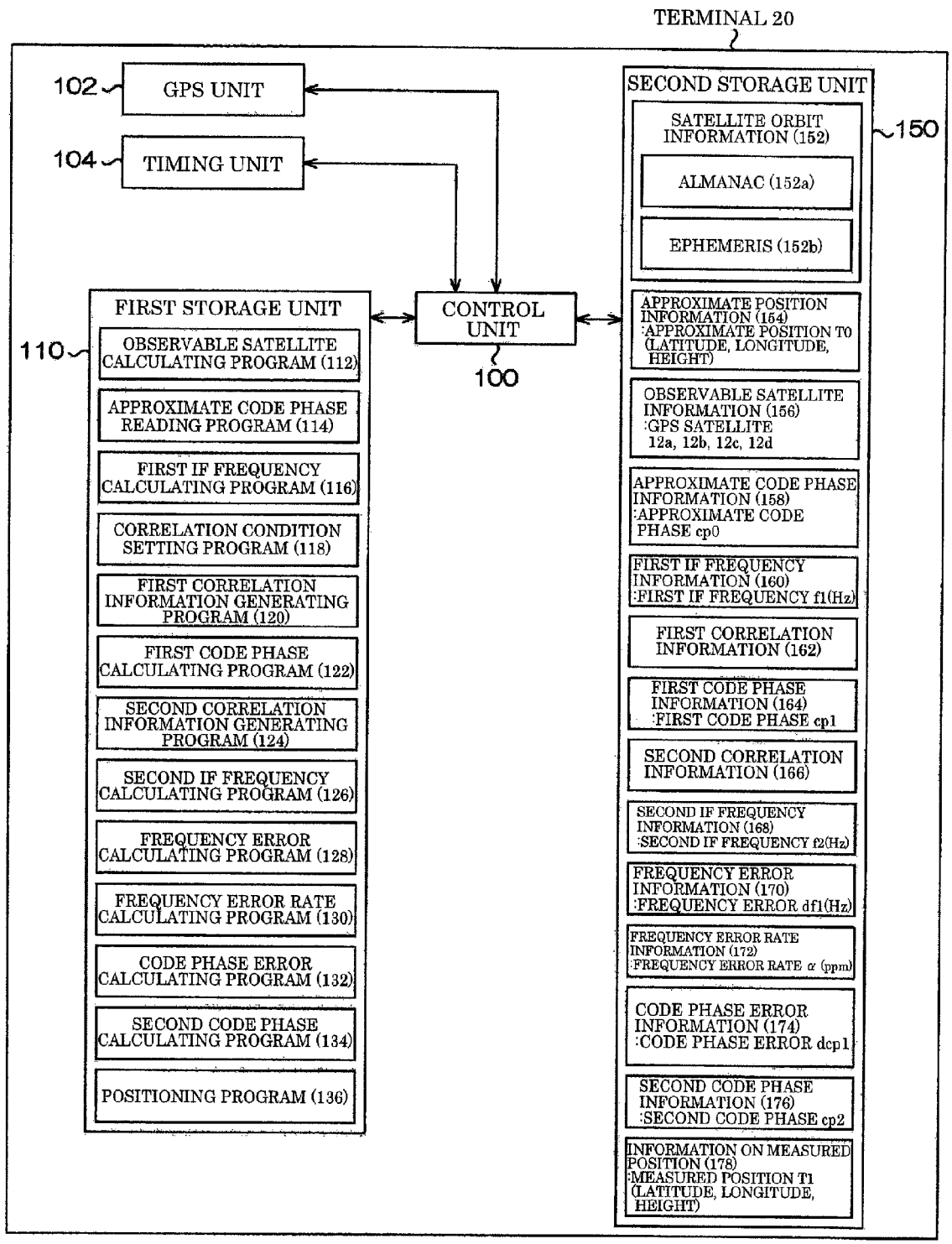
FIG. 4 is a view schematically illustrating the software configuration of a terminal.

FIG. 4 is a view schematically illustrating the software configuration of the terminal 20.

As shown in FIG. 4, the terminal 20 includes a control unit 100 serving to control other units, a GPS unit 102 corresponding to the GPS device 34 of FIG. 2, a timing unit 104 corresponding to the clock 48, a first storage unit 110 serving to store various programs, and a second storage unit 150 serving to store various information.

As shown in FIG. 4, the terminal 20 stores satellite orbit information 152 in the second storage unit 150. The satellite orbit information 152 has almanac 152a and ephemeris 152b. The almanac 152a is information indicating approximate orbits of all GPS satellites (for example, the GPS satellites 12a, 12b, 12c, and 12d). The ephemeris 152b is information indicating a precise orbit of each GPS satellite (for example, the GPS satellite 12a).

The terminal 20 uses the almanac 152a and the ephemeris 152b for the purpose of positioning.

As shown in FIG. 4, the terminal 20 stores approximate position information 154 in the second storage unit 150. The approximate position information 154 is information indicating an approximate current position T0 of the terminal 20. For example, the approximate position T0 is the position that has been measured at the time of previous positioning. The approximate position information 154 is an example of approximate position information.

As shown in FIG. 4, the terminal 20 stores an observable satellite calculating program 112 in the first storage unit 110. The observable satellite calculating program 112 is a program used when the control unit 100 intends to generate observable satellite information 156 indicating a GPS satellite (for example, the GPS satellite 12a), which can be observed from the approximate position T0 at the current time measured by the timing unit 104, by using the almanac 152a.

The control unit 100 stores the generated observable satellite information 156 in the second storage unit 150.

As shown in FIG. 4, the terminal 20 stores approximate code phase information 158 in the second storage unit 150. The approximate code phase information 158 is information indicating an approximate code phase of the C/A code of each GPS satellite.

Here, the code phase means a phase of a C/A code corresponding to a maximum value of a correlation value between the C/A codes received from, for example, the GPS satellite 12a and a replica C/A code generated by the terminal 20.

Further, an approximate code phase cp0 is a phase of a C/A code estimated to correspond to the maximum value of the correlation value between the C/A codes received from, for example, the GPS satellite 12a and the replica C/A code. The approximate code phase information 158 is a code phase corresponding to each GPS satellite (for example, the GPS satellite 12a) used at the time of previous measurement of position. The approximate code phase cp0 is an example of an estimated phase.

As shown in FIG. 4, the terminal 20 stores an approximate code phase reading program 114 in the first storage unit 110. The approximate code phase reading program 114 is a program used when the control unit 100 intends to acquire the approximate code phase cp0, which corresponds to each GPS satellite (for example, the GPS satellite 12a), displayed on the observable satellite information 156 from the second storage unit 150. The approximate code phase reading program 114 and the control unit 100 are an example of an estimated phase acquisition unit.

Alternatively, the control unit 100 may calculate the approximate code phase cp0 on the basis of the ephemeris 152b and the approximate position information 154, unlike in the present embodiment.

As shown in FIG. 4, the terminal 20 stores a first IF frequency calculating program 116 in the first storage unit 110. The first IF frequency calculating program 116 is a program used when the control unit 100 intends to generate first IF frequency information 160 indicating a first IF frequency f1 that is an estimated value of an IF frequency corresponding to each electric wave (for example, the electric wave G1). The first IF frequency f1 is an estimative value of an IF frequency of the electric wave G1 when the terminal 20 receives the electric wave G1 from the GPS satellite 12a at current time, for example. The first IF frequency f1 is an example of a first frequency, and the first IF frequency calculating program 116 and the control unit 100 are an example of a first frequency information generating unit.

FIG. 5 is a view explaining the first IF frequency calculating program 116.

As shown in FIG. 5, the first IF frequency f1 is a frequency obtained by subtracting Doppler shift Bf from a basic IF frequency Af. The basic IF frequency Af is a known value determined on the basis of a frequency when an electric wave (for example, the electric wave G1) is transmitted from the a GPS satellite (for example, the GPS satellite 12a), for example, 1.5 GHz and a down-conversion rate due to a mixer 35c. The Doppler shift Bf is frequency shift occurring due to the relative movement between the terminal 20 and a GPS satellite (for example, the GPS satellite 12a) and is varying all the time. The Doppler shift Bf can be calculated by using the ephemeris 152b and the approximate position T0 of the terminal 20.

Here, since the position of the terminal 20 is not an exact position but the approximate position T0 and the GPS satellite (for example, the GPS satellite 12a) and the terminal 20 make relative movement all the time, the calculated Doppler shift Bf may be different from true Doppler shift.

Accordingly, the first IF frequency f1 may be different from a true IF frequency.

As shown in FIG. 4, the terminal 20 stores a correlation condition setting program 118 in the first storage unit 110. The correlation condition setting program 118 is a program used when the control unit 100 intends to set a condition in the correlation section 37 (refer to FIG. 3).

FIG. 6 is a view explaining the correlation condition setting program 118.

As shown in FIG. 6, correlation conditions includes a terminal-side code phase and a terminal-side IF frequency. The terminal-side code phase is a start point a replica C/A code. The terminal-side IF frequency is a frequency that is generated for synchronization with an IF frequency, such as the electric wave G1, at the terminal side.

The control unit 100 sets, as the terminal-side code phase, 'early' that leads the approximate code phase cp0 by ½ chip, 'normal' equal to the approximate code phase cp0, and 'late' that lags the approximate code phase cp0 by ½ chip.

Moreover, the control unit 100 sets, as the terminal-side IF frequency, 'low' which is a frequency lower than the first IF frequency f1 by fs (Hz), 'middle' which is a frequency equal to the first IF frequency f1, and 'high' which is a frequency higher than the first IF frequency f1 by fs (Hz). The frequency fs is an example of a specified frequency that has been determined beforehand. In addition, the 'low' is an example of a first low frequency and the 'high' is an example of a first high frequency.

As shown in FIG. 4, the terminal 20 stores a first correlation information generating program 120 in the first storage unit 110. The first correlation information generating program 120 is a program used when the control unit 100 intends to generate first correlation information 162 indicating a correlation value between a replica C/A code and a C/A code received from a GPS satellite (for example, the GPS satellite 12*a*) under the condition of the expected IF frequency f1. The first correlation information generating program 120 and the control unit 100 are an example of a first correlation information generating unit.

Specifically, the control unit 100 calculates a correlation value among the above-described 'early', 'normal', and 'late' under the condition of the first IF frequency f1.

The control unit 100 stores the generated first correlation information in the second storage unit 150.

As shown in FIG. 4, the terminal 20 stores a first code phase calculating program 122 in the first storage unit 110. The first code phase calculating program 122 is a program used when the control unit 100 intends to generate first code phase information 164 indicating a first code phase cp1, which is a phase of a C/A code corresponding to a maximum value of a correlation value at the first IF frequency f1, on the basis of the first correlation information 162. The first code phase cp1 is an example of a first phase, and the first code phase information 164 is an example of first phase information. In addition, the first code phase calculating program 122 and the control unit 100 are an example of a first phase information generating unit.

FIGS. 7A and 7B and 8A and 8B are views explaining the first code phase calculating program 122.

Figure 7A:
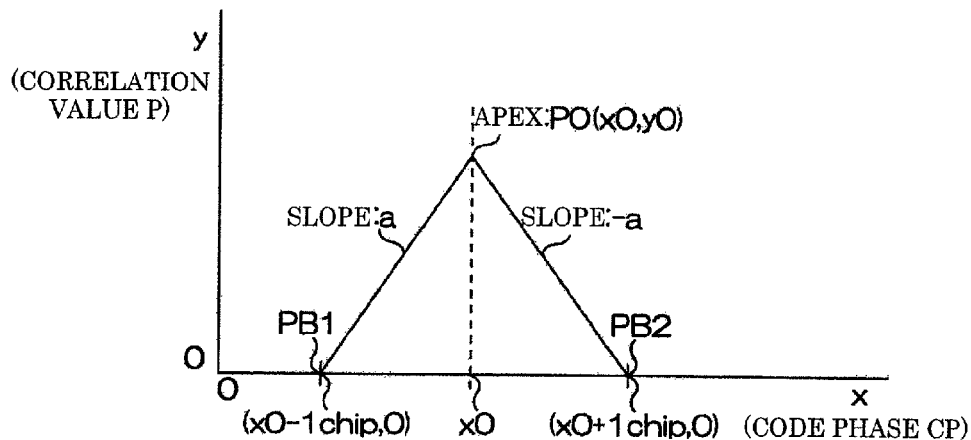
FIG. 7A is a view explaining a first code phase calculating program.

First, as shown in FIG. 7A, in the coordinate system including an x axis indicating a code phase CP and a y axis indicating a correlation value P, it can be seen that correlation values form an isosceles triangle in which a point P0 (x0, y0) corresponding to a maximum value of a correlation value is the apex and a side obtained by connecting points PB1(x0−1 chip, 0) and PB2(x0+1 chip, 0) on the X axis is the base. At this time, assuming that a slope of a straight line obtained by connecting the point PB1 with the apex P0 is a (a is a positive number), a slope of a straight line obtained by connecting the apex P0 with the point PB2 is '−a'.

The above triangle indicating correlation values can be expressed as equations shown in equation 1. In the equation 1, there are three unknown quantities of x0, y0, and a.

Figure 7B:
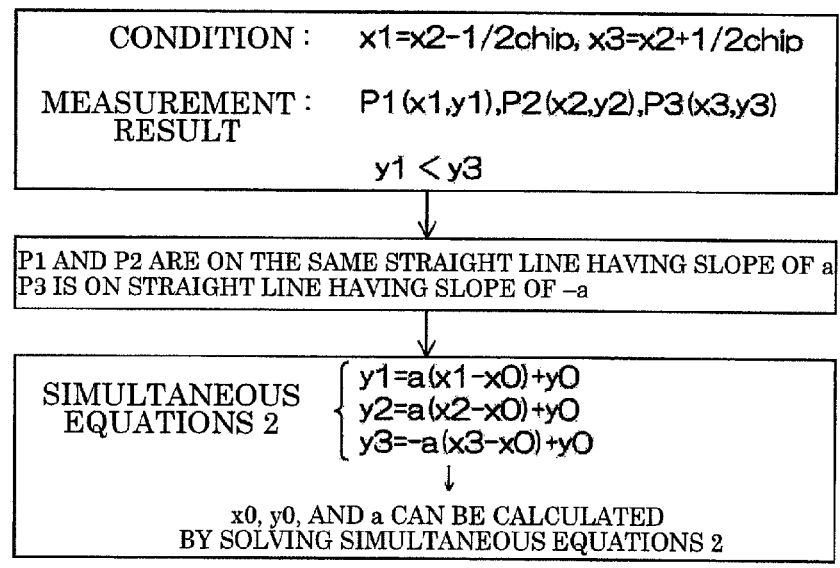
FIG. 7B is a view explaining the first code phase calculating program.

FIG. 7B is an explanatory view illustrating an example of calculating the unknown quantities in the equation 1 on the basis of three measurement results.

First, the code phase CP to be measured is set as x1, x2, and x3, where x1 leads x2 by ½ chip and x3 lags x2 by ½ chip.

Further, it is assumed that the measurement result is P1(x1, y1), P2(x2, y2), and P3(x3, y3), and y1 is smaller than y3.

In this case, it is clear that the points P1 and P2 are positioned at the left side of the apex P0 (refer to FIG. 7A) and the point P3 is located at the right side of the apex P0. That is, the points P1 and P2 are positioned on the same straight line having the slope of 'a', and the point P3 is positioned on the straight line having a slope of '−a'.

Accordingly, simultaneous equations 2 having three equations can be obtained, and then the unknown quantities x0, y0, and a can be calculated by solving the simultaneous equations 2.

Figure 8A:
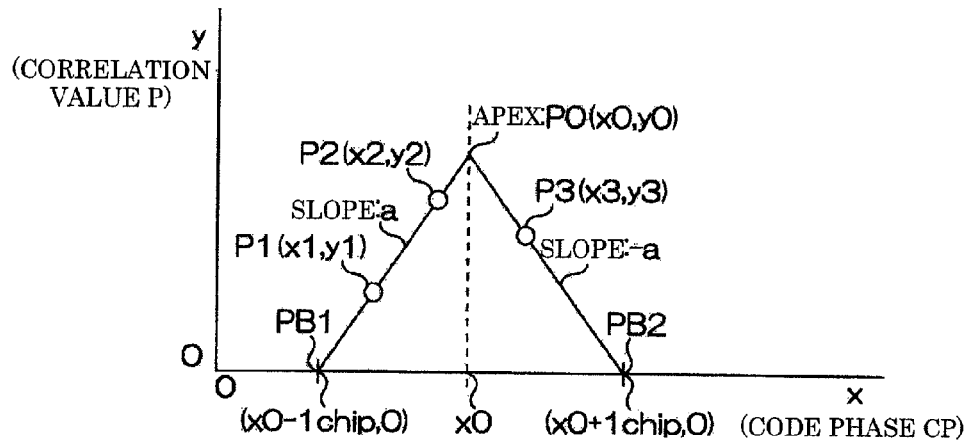
FIG. 8A is a view explaining the first code phase calculating program.

FIG. 8A is a view explaining the description, which has been made with reference to FIGS. 7A and 7B, in the present embodiment.

In the present embodiment, P1 denotes phase and correlation value of 'early', P2 denotes phase and correlation value of 'normal', and P3 denotes phase and correlation value of 'late'. Here, if y1 is smaller than y3, the simultaneous equations 2 shown in FIG. 7B are effective. Accordingly, x0 can be calculated.

The phase x0 is the first phase first code phase cp1.

The control unit 100 stores the first code phase information 164 in the second storage unit 150.

The first phase cp1 is a phase obtained by modifying the approximate code phase cp0 under the condition of the first IF frequency f1. However, since the first IF frequency f1 used in calculating the first code phase cp1 may not be accurate, the first code phase cp1 includes an error corresponding to an error of the first IF frequency f1 with respect to a true IF frequency. In other words, there is a possibility that the first code phase cp1 does not accurately reflect the phase of a C/A code of a specific GPS satellite (for example, the GPS satellite 12*a*).

Figure 8B:
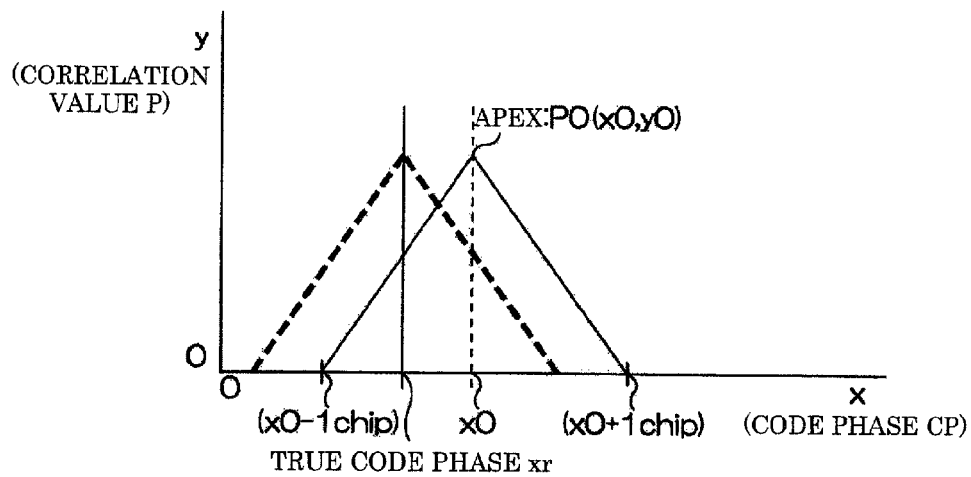
FIG. 8B is a view explaining the first code phase calculating program.

In the case when the first IF frequency f1 is not accurate, the first phase x0 deviates from a true code phase xr in the code phase CP direction, which is shown as an example in FIG. 8B. For this reason, in the case when positioning and calculation of a pseudo range are performed under the condition of the first phase x0, the precision of a positioning result is reduced.

As shown in FIG. 4, the terminal 20 stores a second correlation information generating program 124 in the first storage unit 110. The second correlation information generating program 124 is a program used when the control unit 100 intends to generate second correlation information 166 indicating a correlation value among the 'middle' which is a frequency equal to the first IF frequency f1, the 'low' which is a frequency lower than the first IF frequency f1 by fs (Hz), and 'high' which is a frequency higher than the first IF frequency f1 by fs (Hz), under the condition of the approximate code phase cp0. The second correlation information 166 is an example of second correlation information. The second correlation information generating program 124 and the control unit 100 are an example of a second correlation information generating unit.

As shown in FIG. 4, the terminal 20 stores a second IF frequency calculating program 126 in the first storage unit 110. The second IF frequency calculating program 126 is a program used when the control unit 100 intends to generate second IF frequency information 168 indicating a second IF frequency f2 that is a frequency corresponding to a maximum value of a correlation value in the approximate code phase cp0. The second IF frequency f2 is an example of a second frequency, and the second IF frequency information 168 is an example of second frequency information. In addition, the second IF frequency calculating program 126 and the control unit 100 are an example of a second frequency information generating unit.

FIGS. 9A to 9C are views explaining the second IF frequency calculating program 126.

The relationship between a frequency w and the correlation value P can be indicated as a curve shown in FIG. 9A. A frequency w0 corresponding to the apex Q0 (w0, y0) is a true IF frequency.

The curve shown in FIG. 9A is expressed by equation 3 shown in FIG. 9B. In the equation 3, there are three unknown quantities of b, w0, and y0.

Therefore, by obtaining simultaneous equations 4 shown in FIG. 9C on the basis of the second correlation information 166 indicating a correlation value corresponding to three frequencies, it is possible to calculate the unknown quantities of b, w0, and y0.

The w0 is the second IF frequency f2. The second IF frequency f2 represents a true IF frequency.

As shown in FIG. 4, the terminal 20 stores a frequency error calculating program 128 in the first storage unit 110. The frequency error calculating program 128 is a program used when the control unit 100 intends to generate frequency error information 170 indicating a frequency error df1 that is a frequency difference between the first IF frequency f1 and the second IF frequency f2. The frequency error df1 is an example of the frequency difference, and the frequency error information 170 is an example of frequency difference information. In addition, the frequency error calculating program 128 and the control unit 100 are an example of a frequency difference information generating unit.

FIG. 10 is a view explaining the frequency error calculating program 128.

As shown in FIG. 10, the control unit 100 calculates the frequency error df1 on the basis of equation 5 in which the second IF frequency f2 is subtracted from the first IF frequency f1.

The control unit 100 stores the generated frequency error information 170 in the second storage unit 150.

As shown in FIG. 4, the terminal 20 stores a frequency error rate calculating program 130 in the first storage unit 110. The frequency error rate calculating program 130 is a program used when the control unit 100 intends to generate frequency error rate information 172 indicating a frequency error rate $\alpha$ that is a ratio of the frequency error df1 to the first IF frequency f1. The frequency error rate information 172 is an example of frequency difference rate information. In addition, the frequency error rate calculating program 130 and the control unit 100 are an example of a frequency difference rate information generating unit.

FIG. 11 is a view explaining the frequency error rate calculating program 130.

As shown in FIG. 11, the control unit 100 calculates the frequency error rate $\alpha$ on the basis of equation 6 in which the frequency error df1 is divided by the first IF frequency f1. The control unit 100 stores the generated frequency error rate information 172 in the second storage unit 150.

As shown in FIG. 4, the terminal 20 stores a code phase error calculating program 132 in the first storage unit 110. The code phase error calculating program 132 is a program used when the control unit 100 intends to generate code phase error information 174 indicating a code phase error dcp1, which is an error of the first code phase cp1 with respect to a true code phase, on the basis of the frequency error rate information 172. The code phase error information 174 is an example of first phase error information. In addition, the code phase error calculating program 132 and the control unit 100 are an example of a first phase error information generating unit.

FIG. 12 is a view explaining the code phase error calculating program 132.

As shown in FIG. 12, the control unit 100 calculates the code phase error dcp1 on the basis of equation 7 in which the frequency error rate $\alpha$ is multiplied by a code phase range R (1023 chips) and the integration number of times (incoherent number of times) n.

Here, since the C/A code is carried on an electric wave (for example, the electric wave G1), an error rate of a code phase is equal to the frequency error rate $\alpha$. Accordingly, the code phase error dcp1 can be calculated from the equation 7.

The control unit 100 stores the generated code phase error information 174 in the second storage unit 150.

As shown in FIG. 4, the terminal 20 stores a second code phase calculating program 134 in the first storage unit 110. The second code phase calculating program 134 is a program used when the control unit 100 intends to generate second code phase information 176 indicating a second code phase cp2 by correcting the first code phase information 164 on the basis of the code phase error information 174. The second code phase cp2 is an example of a second phase, and the second code phase information 176 is an example of second phase information. In addition, the second code phase calculating program 134 and the control unit 100 are an example of a second phase information generating unit.

FIG. 13 is a view explaining the second code phase calculating program 134.

As shown as an example in FIG. 13, the control unit 100 calculates the second code phase cp2 on the basis of equation 8 in which the code phase error dcp1 is subtracted from the first code phase cp1. As for the second code phase cp2, an error due to an error of the first IF frequency f1 is removed. That is, it can be assumed that the second code phase cp2 is equal to the true code phase.

The control unit 100 stores the generated second code phase information 176 in the second storage unit 150.

As shown in FIG. 4, the terminal 20 stores a positioning program 136 in the first storage unit 110. The positioning program 136 is a program used when the control unit 100 intends to measure a current position on the basis of the second code phase information 176 on at least three GPS satellites (for example, the GPS satellites 12a, 12b, and 12c). The positioning program 136 and the control unit 100 are an example of a positioning unit.

The control unit 100 calculates a pseudo range between the terminal 20 and each GPS satellite (for example, the GPS satellite 12a) by using the second code phase cp2 and measures the current position by using the ephemeris 152b of each GPS satellite (for example, the GPS satellite 12a). Since details of a positioning method are known, an explanation thereof will be omitted.

The terminal 20 is configured as described above.

The terminal 20 can generate the first correlation information 162 (refer to FIG. 4) indicating a correlation value, at the first IF frequency f1, between the replica C/A code and the C/A code received from a GPS satellite (for example, the GPS satellite 12a).

Moreover, the terminal 20 can generate the first code phase information 164 on the basis of the first correlation information 162.

At this time, the C/A code is carried on an electric wave (for example, the electric wave G1). Accordingly, if the first IF frequency f1 is deviated from the true IF frequency, the precision of the first correlation information 162 is reduced in accordance with the deviation rate. As a result, the precision of the first code phase information 164 is also reduced.

This can be solved as follows. That is, the terminal 20 can correct the code phase 164 on the basis of the deviation between the first IF frequency f1 and the true IF frequency.

A correlation value between a C/A code and a replica C/A code in a predetermined phase can be expressed by the equation 3 (refer to FIG. 9B) in which three unknown quantities of a maximum value of a correlation value, a frequency corresponding to the maximum value of the correlation value, and one variable are used. Therefore, the above equation 3 can be solved by calculating a correlation value with respect to at least three frequencies, and thus the frequency corresponding to the maximum value of the correlation value can be calculated.

The terminal 20 is configured to generate the second correlation information 166 (refer to FIG. 4) with respect to three frequencies of the first frequency f1 serving as a frequency of 'middle', a frequency of 'low', and a frequency of 'high' (refer to FIG. 6). In addition, the terminal 20 can generate the second IF frequency information 168 (refer to FIG. 4) indicating the second IF frequency f2 corresponding to the maximum value of a correlation value in the approximate code phase cp0, on the basis of the second correlation information 166.

In addition, the terminal 20 can generate the frequency error information 170 (refer to FIG. 4) indicating the frequency difference between the first IF frequency f1 and the second IF frequency f2 and calculate the frequency error rate α that is a ratio of the frequency error df1 to the first IF frequency f1.

Here, since the C/A code is carried on an electric wave (for example, the electric wave G1), the frequency error rate α is equal to an error rate of the first code phase cp1 with respect to a true phase of a C/A code.

Accordingly, the terminal 20 can generate the code phase error information 174 indicating an error of the first IF code phase cp1 on the basis of the frequency error rate information 172.

Further, the terminal 20 can calculate the second code phase cp2 by correcting the first code phase cp1 on the basis of the code phase error information 174.

Furthermore, the terminal 20 can measure the current position on the basis of the second code phase cp2 on at least three GPS satellites (for example, the GPS satellites 12a, 12b, and 12c).

As described above, the terminal 20 performs the positioning process on the basis of the second code phase cp2 that is generated by correcting the first code phase cp1 on the basis of code phase error information 174. Here, the code phase error information 174 is not information generated on the basis of the first code phase information 164. This means that a correlation process of generating the first code phase information 164 and a correlation process of generating the code phase error information 174 can be performed simultaneously and in parallel. Accordingly, by simultaneously performing a plurality of correlation processes at predetermined timing, it is possible to perform a positioning process without performing a subsequent correlation process at different time. In other words, the positioning process can be performed on the basis of a correlation result generated at the predetermined timing, without modifying subsequent correlation processes due to time-lag information.

Thus, in the case when the strength of a satellite wave is very weak and a long integration time for positioning codes is required, the position can be measured with high precision.

In addition, since the terminal 20 is configured to generate the first IF frequency information 160 on the basis of the approximate position information 154 stored beforehand and the ephemeris 152b (refer to FIG. 4), it is possible to generate the first IF frequency information 160 without performing a correlation process.

In addition, since the terminal 20 is configured to acquire the approximate code phase cp0 that is a phase at the time of previous measurement of position, it is possible to acquire the approximate code phase cp0 without performing a correlation process.

Hereinbefore, the configuration of the terminal 20 according to the present embodiment has been described. Hereinafter, an example of an operation of the terminal 20 will be described mainly with reference to FIG. 14.

Figure 14:
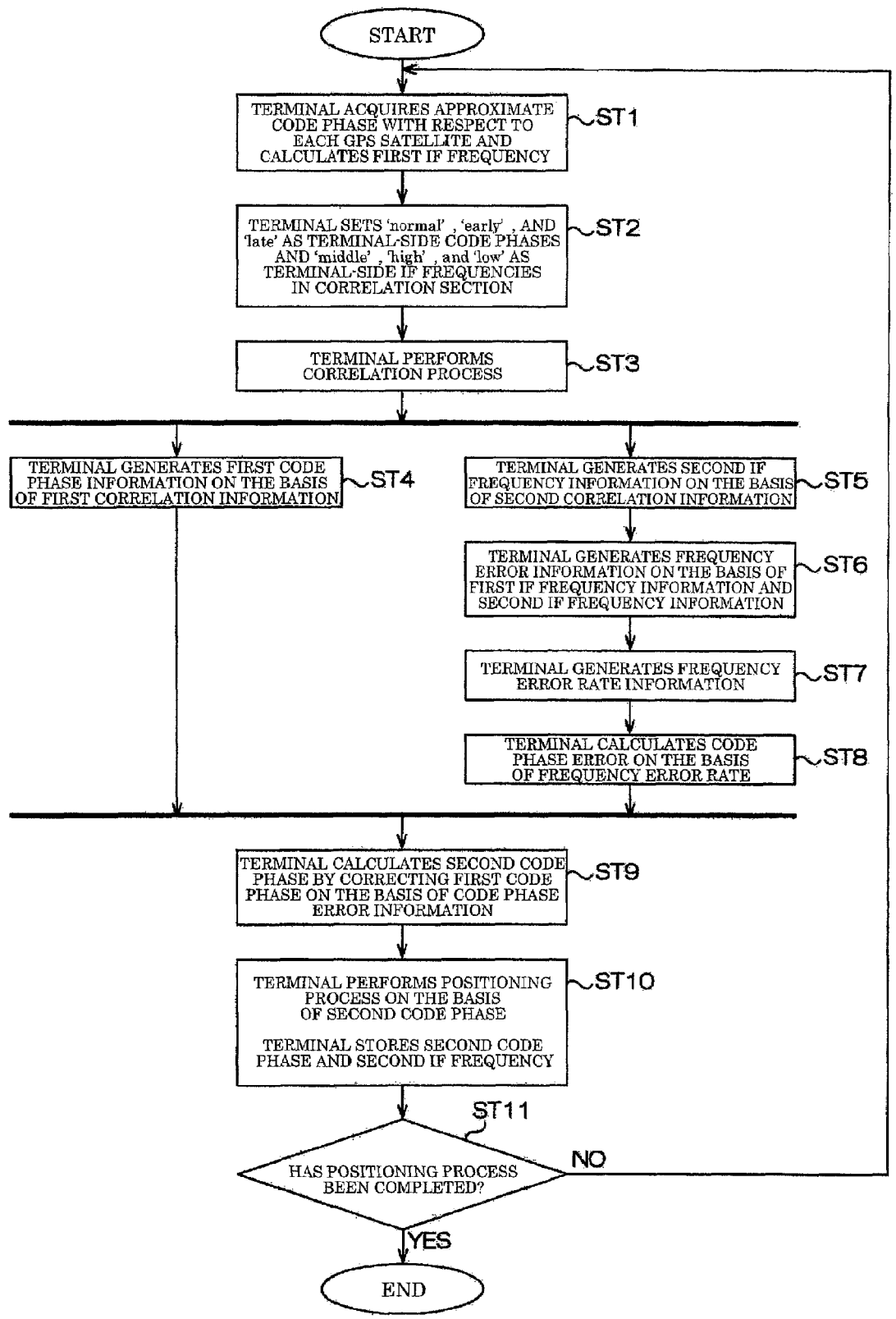
FIG. 14 is a flow chart schematically illustrating an example of an operation of a terminal.

FIG. 14 is a flow chart schematically illustrating an example of the operation of the terminal 20.

First, the terminal 20 acquires the approximate code phase cp0 (refer to FIG. 4) with respect to each GPS satellite (for example, the GPS satellite 12a) so as to calculate the first IF frequency f1 (refer to FIG. 4) (step ST1 of FIG. 14). The step ST1 is an example of generating the first frequency information and is also an example of acquiring the estimated phase.

Subsequently, the terminal 20 sets 'early', 'normal', and 'late', as terminal-side code phases, in the correlation section 37 (refer to FIG. 3). In addition, the terminal 20 sets 'low', 'middle', and 'high' as terminal-side IF frequencies (step ST2).

Then, the terminal 20 performs a correlation process (step ST3). In the step ST3, the first correlation information 162 (refer to FIG. 4) and the second correlation information 166 (refer to FIG. 4) are generated. The step ST3 is an example of generating the first correlation information and is also an example of generating the second correlation information.

Thereafter, the terminal 20 generates the first code phase information 164 (refer to FIG. 4) on the basis of the first correlation information 162 (step ST4). The step ST4 is an example of generating the first phase information.

The terminal 20 performs steps ST5, ST6, ST7, and ST8 in parallel with the step ST4.

Here, the terminal 20 first generates the second IF frequency information 168 (refer to FIG. 4) on the basis of the second correlation information 166 (step ST5). The step ST5 is an example of generating the second frequency information.

Then, the terminal 20 generates the frequency error information 170 (refer to FIG. 4) on the basis of the first IF frequency information 160 and the second IF frequency information 168 (step ST6). The step ST6 is an example of generating the frequency difference information.

Subsequently, the terminal 20 generates the frequency error rate information 172 (refer to FIG. 4) (step ST7). The step ST7 is an example of generating the frequency difference rate information.

Then, the terminal 20 calculates the code phase error dcp1 (refer to FIG. 4) on the basis of the frequency error rate α (step ST8). The step ST8 is an example of generating the first phase error information.

Then, the terminal 20 calculates the second code phase cp2 (refer to FIG. 4) by correcting the first code phase cp1 on the basis of the code phase error information 174. The step ST9 is an example of generating the second phase information.

Thereafter, the terminal 20 performs a positioning process on the basis of the second code phase cp2 (step ST10). The step ST10 is an example of performing a positioning process.

In addition, in the step ST10, the terminal 20 stores the second code phase cp2 as a new approximate code phase cp0 and the second IF frequency f2 as a new first IF frequency f1. Thus, the approximate code phase cp0 can be updated. Furthermore, at the time of next positioning, it is possible to read out the first IF frequency f1 without calculating the first IF frequency f1 by means of computation.

As described above, since the terminal 20 does not use the previous correlation result in a subsequent correlation process, the step ST4 can be performed in parallel with the steps ST5 to ST8. In addition, the second code phase cp2 can be calculated by correcting the first code phase cp1 generated in the step ST4 on the basis of the code phase error information 174 generated in the steps ST5 to ST8. This means that once search for an electric wave (for example, the electric wave G1) from a GPS satellite (for example, the GPS satellite 12a) is completed and the electric wave (for example, the electric wave G1) is detected, the terminal 20 can measure the position even when an electric wave (for example, the electric wave G1) cannot be tracked.

Therefore, in the case when the strength of the satellite wave is very weak and a long integration time for positioning codes is required, the position can be measured with high precision.

Second Embodiment

Next, a second embodiment will be described.

Since the configuration of the terminal 20A (refer to FIG. 1) in the second embodiment has much in common with that of the terminal 20 in the first embodiment, the common parts are denoted by the same reference numerals, and an explanation thereof will be omitted. Hereinafter, it will be described about different points.

Figure 15:
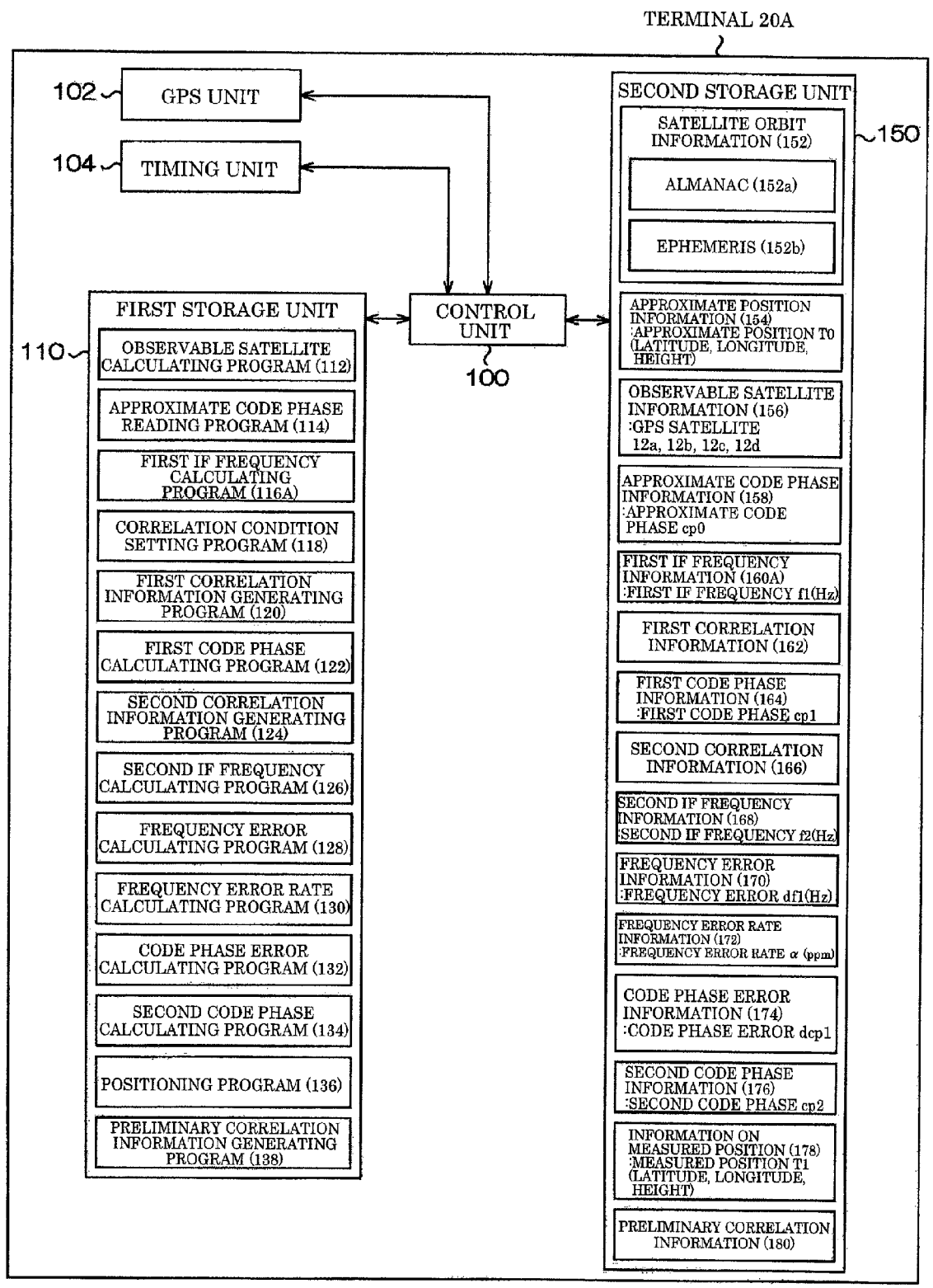
FIG. 15 is a view schematically illustrating the main software configuration of a terminal.

FIG. 15 is a view schematically illustrating the main software configuration of the terminal 20A.

As shown in FIG. 15, the terminal 20A stores a preliminary correlation information generating program 138 in the first storage unit 110.

The preliminary correlation information generating program 138 is a program used when the control unit 100 intends to generate preliminary correlation information 180 indicating a correlation value among three frequencies of 'middle' serving as the first IF frequency f1, 'low', and 'high' (refer to FIG. 6), in the approximate code phase cp0 of a replica C/A code and a C/A code received from a GPS satellite (for example, the GPS satellite 12a). The preliminary correlation information 180 is an example of preliminary correlation information. In addition, the preliminary correlation information generating program 138 and the control unit 100 are an example of a preliminary correlation information generating unit.

The control unit 100 stores the generated preliminary correlation information 180 in the second storage unit 150.

A first IF frequency calculating program 116A of the terminal 20A is configured to generate first IF frequency information 160A on the basis of the preliminary correlation information 180.

Since the first frequency information 160A is generated on the basis of the preliminary correlation information 180 generated by actually performing a correlation process, the first frequency information 160A is high-precision information. Accordingly, the precision of the first code phase information 164 also increases.

In addition, since the first code phase information 164 is the high-precision information before correction, the second code phase information 176 generated by the correction based on the code phase error information 174 becomes more precise information.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A positioning method for a positioning apparatus that measures a position by using a code phase of a measurement basis code carried on a satellite wave from a positioning satellite, the method comprising:
    calculating a first frequency, the first frequency being an estimated value of a receiving frequency of the satellite wave;
    acquiring an estimated phase of the measurement basis code estimated to correspond to a maximum value of a correlation value between the measurement basis code and a replica measurement basis code generated by the positioning apparatus;
    calculating a first phase, the first phase being a phase of the measurement basis code corresponding to a maximum value of the correlation value at the first frequency;
    calculating a second frequency, the second frequency being a frequency corresponding to a maximum value of the correlation value in the estimated phase;
    calculating a second phase by correcting the first phase on the basis of the relationship between the first frequency and the second frequency; and
    measuring the position by using the second phase.

2. The method according to claim 1 wherein the measurement basis code is a C/A code.

3. The method according to claim 1, wherein the calculating of the second phase includes
    calculating an error of the first phase by using a ratio of a frequency difference between the first frequency and the second frequency to the first frequency, and
    calculating the second phase by correcting the first phase by using the error of the first phase.

4. The method according to claim 1, wherein
    the calculating of the first frequency includes calculating the first frequency on the basis of orbit information indicating an orbit of the positioning satellite and approximate position information of the positioning apparatus stored beforehand.

5. The method according to claim 1, wherein
    the acquiring of the estimated phase includes calculating and acquiring the estimated phase on the basis of orbit information indicating an orbit of the positioning satellite and approximate position information of the positioning apparatus stored beforehand.

6. The method according to claim 1, wherein
    the acquiring of the estimated phase includes acquiring the second phase at the time of previous measurement of position as the estimated phase.

7. The method according to claim 1, further comprising
    calculating a preliminary correlation value, the preliminary correlation value being a correlation value between the measurement basis code and the replica measurement basis code under the condition of the estimated phase, in a plurality of frequencies including the first frequency respectively, and
    calculating the first frequency on the basis of the preliminary correlation value.

8. A computer-readable recording medium storing a program for a computer included in a positioning apparatus, the positioning apparatus measuring a position by using a code phase of a measurement basis code carried on a satellite wave from a positioning satellite, the program causing the computer to:

calculate a first frequency, the first frequency being an estimated value of a receiving frequency of the satellite wave;

acquire an estimated phase of the measurement basis code estimated to correspond to a maximum value of a correlation value between the measurement basis code and a replica measurement basis code generated by the positioning apparatus;

calculate a first phase, the first phase being a phase of the measurement basis code corresponding to a maximum value of the correlation value at the first frequency;

calculate a second frequency, the second frequency being a frequency corresponding to a maximum value of the correlation value in the estimated phase;

calculate a second phase by correcting the first phase on the basis of the relationship between the first frequency and the second frequency; and measure the position by using the second phase.

* * * * *